US009289803B1

(12) United States Patent
Parks

(10) Patent No.: US 9,289,803 B1
(45) Date of Patent: Mar. 22, 2016

(54) DISPENSER APPARATUS AND METHOD

(71) Applicant: Steve A. Parks, Georgetown, TX (US)

(72) Inventor: Steve A. Parks, Georgetown, TX (US)

( * ) Notice: Subject to any disclaimer, the term of this patent is extended or adjusted under 35 U.S.C. 154(b) by 254 days.

(21) Appl. No.: 13/901,898

(22) Filed: May 24, 2013

(51) Int. Cl.
*F16K 3/36* (2006.01)
*B08B 9/032* (2006.01)

(52) U.S. Cl.
CPC .................................... *B08B 9/032* (2013.01)

(58) Field of Classification Search
CPC .................. Y10T 137/6969; Y10T 137/4259; Y10T 137/86035; B08B 9/32; F24F 13/222; F24F 2013/228; F25D 21/14
See application file for complete search history.

(56) References Cited

U.S. PATENT DOCUMENTS 3,677,285 A * 7/1972 Adams ..................... F16L 9/20 137/357
5,514,344 A 5/1996 D'Agaro
5,975,113 A 11/1999 Haining et al.
6,041,611 A * 3/2000 Palmer ................. B08B 9/0325 137/240
6,581,625 B1 * 6/2003 Arai ..................... B08B 9/0325 134/1
6,708,717 B1 * 3/2004 Coogle ................ B08B 9/0321 134/166 C
6,892,907 B2 5/2005 Varney
7,392,658 B1 7/2008 Hardy, III
7,857,004 B2 12/2010 Pearson
8,075,769 B1 12/2011 Gleason et al.
8,961,708 B2 * 2/2015 Kaiser .................... B08B 9/032 134/166 C
2003/0010381 A1 * 1/2003 Kimbrough .............. A61L 2/18 137/240
2011/0061745 A1 3/2011 Pearson
2013/0306163 A1 * 11/2013 Hubbard, Sr. ............ B08B 5/02 137/237
2014/0338758 A1 * 11/2014 Oakner .................. B08B 9/027 137/240

FOREIGN PATENT DOCUMENTS

JP 4052499 2/1992
JP 2008095996 4/2008

* cited by examiner

*Primary Examiner* — Jessica Cahill
(74) *Attorney, Agent, or Firm* — Dennis D. Brown; Brown Patent Law, P.L.L.C.

(57) ABSTRACT

A dispenser and procedure for disinfecting and cleaning air conditioner condensation drainage lines and other condensation drainage lines. The dispenser can be installed at any convenient location on any floor of a home or other building, regardless of whether the location is below, above, or at the same elevation as the inlet of the condensation drainage line. The dispenser includes a liquid pump for delivering an amount of treatment fluid into a treatment delivery line and an air pump for pushing the dose of treatment fluid through the treatment delivery line and into the condensation drainage line.

6 Claims, 3 Drawing Sheets

DISPENSER APPARATUS AND METHOD

FIELD OF THE INVENTION

The present invention relates to apparatuses and methods for disinfecting, cleaning, clearing, and/or otherwise treating condensation drainage lines for air conditioning units and other systems.

BACKGROUND OF THE INVENTION

A need exist for an improved device and procedure for more effectively disinfecting, cleaning, and/or clearing air conditioner condensation drainage lines installed in homes, offices and other buildings. If left untreated, air conditioner condensation drainage lines can present ideal conditions for the growth and build-up of bacteria, algae, mold, and mildew and are also prone to collecting dust, insulation fibers, and other debris commonly present in attics and in similar environments. Untreated condensation drainage lines therefore not only present a significant health risk, but are also susceptible to clogging and overflow.

Unfortunately, the systems currently available in the art for treating air conditioner condensate drainage lines have several shortcomings and disadvantages. For example, to (a) allow gravity flow of the treatment fluid into the condensate drainage line, (b) avoid excessive cost, and (c) limit the amount of fluid required per treatment, it has commonly been necessary that the treatment system be installed in the same room where the air conditioning/heater system is also located, i.e., typically the user's attic. As a result, the user has been required to carry heavy items and materials up a ladder or up a set of stairs and to spend a considerable amount of time in the attic, not only when installing the treatment system, but also when refilling or replacing the treatment fluid and when operating the system.

Of course, in addition to being difficult to reach, especially when carrying heavy items or materials, attics are typically very hot in the summertime and commonly present serious hazards such as, for example, inadequate flooring, no flooring at all, exposed nails which extend through the roof, etc. Consequently, the attic is usually the most uncomfortable and unsafe area in the home and often cannot even be reached by the elderly or by individuals who are injured or disabled.

SUMMARY OF THE INVENTION

The present invention provides a dispenser apparatus and method which satisfy the needs and alleviate the problems discussed above. In addition to being effective, efficient, simple to maintain, simple to operate, and low cost, the inventive dispenser can be installed (a) at ground level (e.g., in a garage), (b) in the attic with the air conditioning/heating system, or (c) in any other room on any floor or level of the building. In other words, the inventive dispenser can be installed anywhere, regardless of whether it is above, below, or at the same elevation as the air conditioner condensation drip pan or the inlet of the condensate drainage line.

In one aspect, there is provided a dispenser apparatus for treating a condensate drainage line comprising: a container for a treatment fluid; a liquid pump having an inlet for receiving the treatment fluid from the container, the liquid pump also having a discharge for delivering the treatment fluid to a treatment delivery line; and an air pump having a discharge for delivering air to the treatment delivery line.

The inventive dispenser apparatus preferably also comprises a control device which is in electronic communication with the liquid pump and the air pump. The control device preferably has programmed instructions stored therein such that the control device will operate to (a) activate the liquid pump to deliver an amount of the treatment fluid into the treatment delivery line and then (b) activate the air pump to discharge an amount of air sufficient to push the amount of the treatment fluid through the treatment delivery line. In addition, the inventive dispenser apparatus preferably further comprises a manual actuator electronically linked to the control device to cause the control device to operate in accordance with its programmed instructions.

In another aspect, there is provided a method of treating a condensation drainage line. The method comprises the steps of (a) positioning the outlet end of the treatment delivery line of a dispenser apparatus such that the treatment delivery line will deliver a treatment fluid to the condensation drainage line and (b) dispensing an amount of the treatment fluid from the dispenser apparatus to the condensation drainage line. The dispenser apparatus used in the method preferably comprises: a container for the treatment fluid; a liquid pump having an inlet for receiving the treatment fluid from the container, the liquid pump also having a discharge for delivering the treatment fluid to the treatment delivery line; and an air pump having a discharge for delivering air to the treatment delivery line.

In step (b) of the inventive method, the amount of the treatment fluid is preferably dispensed from of the dispensing apparatus to the condensation drainage line by the steps of: (i) activating the liquid pump to deliver the amount of the treatment fluid into the treatment delivery line and then (ii) activating the air pump to discharge an amount of air sufficient to push the amount of the treatment fluid through the treatment delivery line to the condensation drainage line.

In another aspect of the inventive method wherein the delivery point for delivering the treatment fluid to the condensation drainage line in step (b) is located at an upper elevation, the inventive method can include the additional steps, prior to step (a), of (i) mounting the dispenser apparatus at a lower elevation which is below the upper elevation and (ii) extending the treatment delivery line from the dispenser apparatus at the lower elevation to the delivery point at the upper elevation. By way of example, the treatment fluid delivery point can be located in an attic or upper floor of a building and the dispenser apparatus can optionally be mounted in step (i) in a different floor of the building which is elevationally lower than the attic or upper floor.

Further aspects, features, and advantages of the present invention will be apparent to those of ordinary skill in the art upon examining the accompanying drawings and upon reading the following Detailed Description of the Preferred Embodiments.

DETAILED DESCRIPTION OF THE PREFERRED EMBODIMENTS

Figure 1:
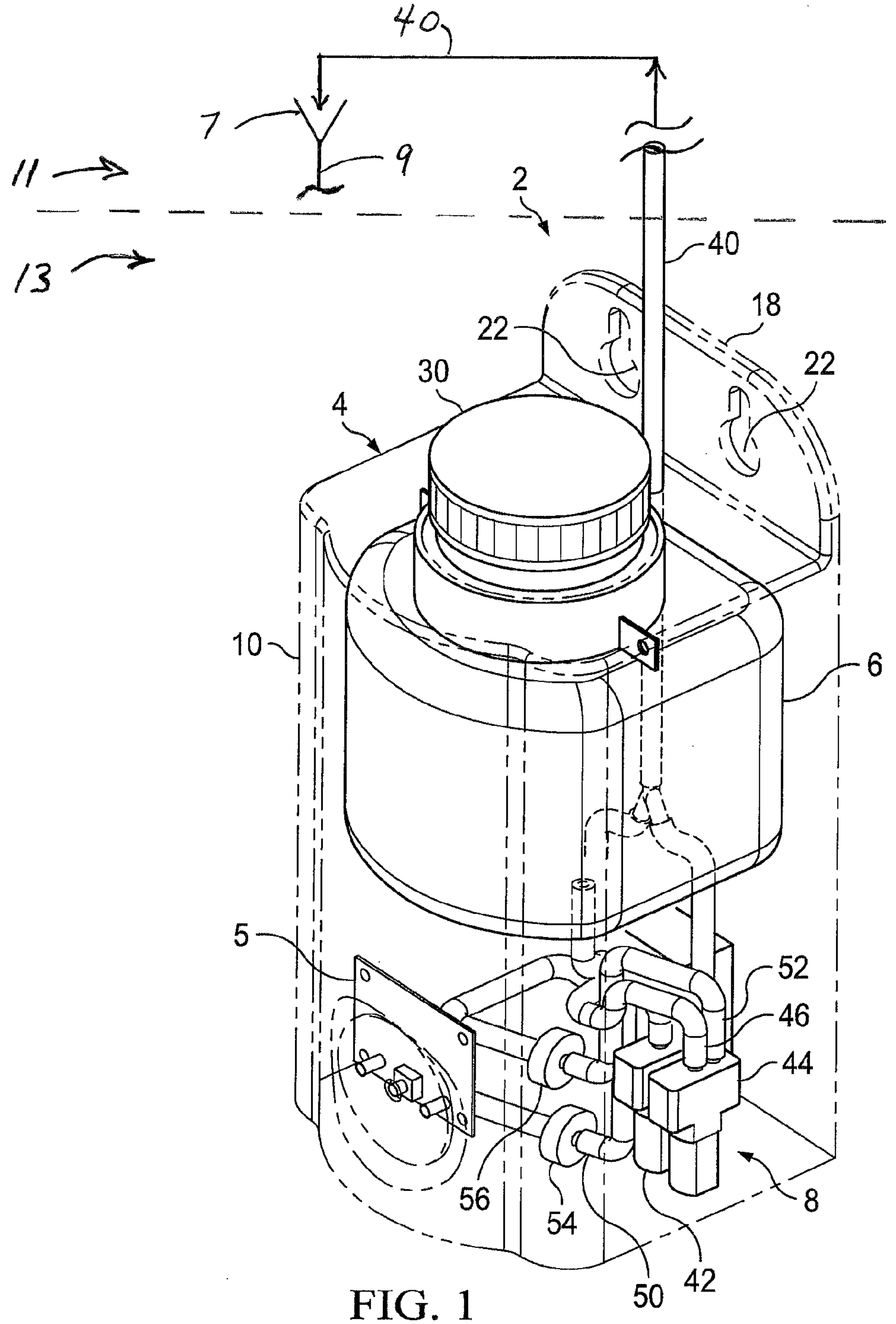
FIG. 1 is a front perspective view of an embodiment 2 of the dispenser apparatus provided by the present invention.
Figure 2:
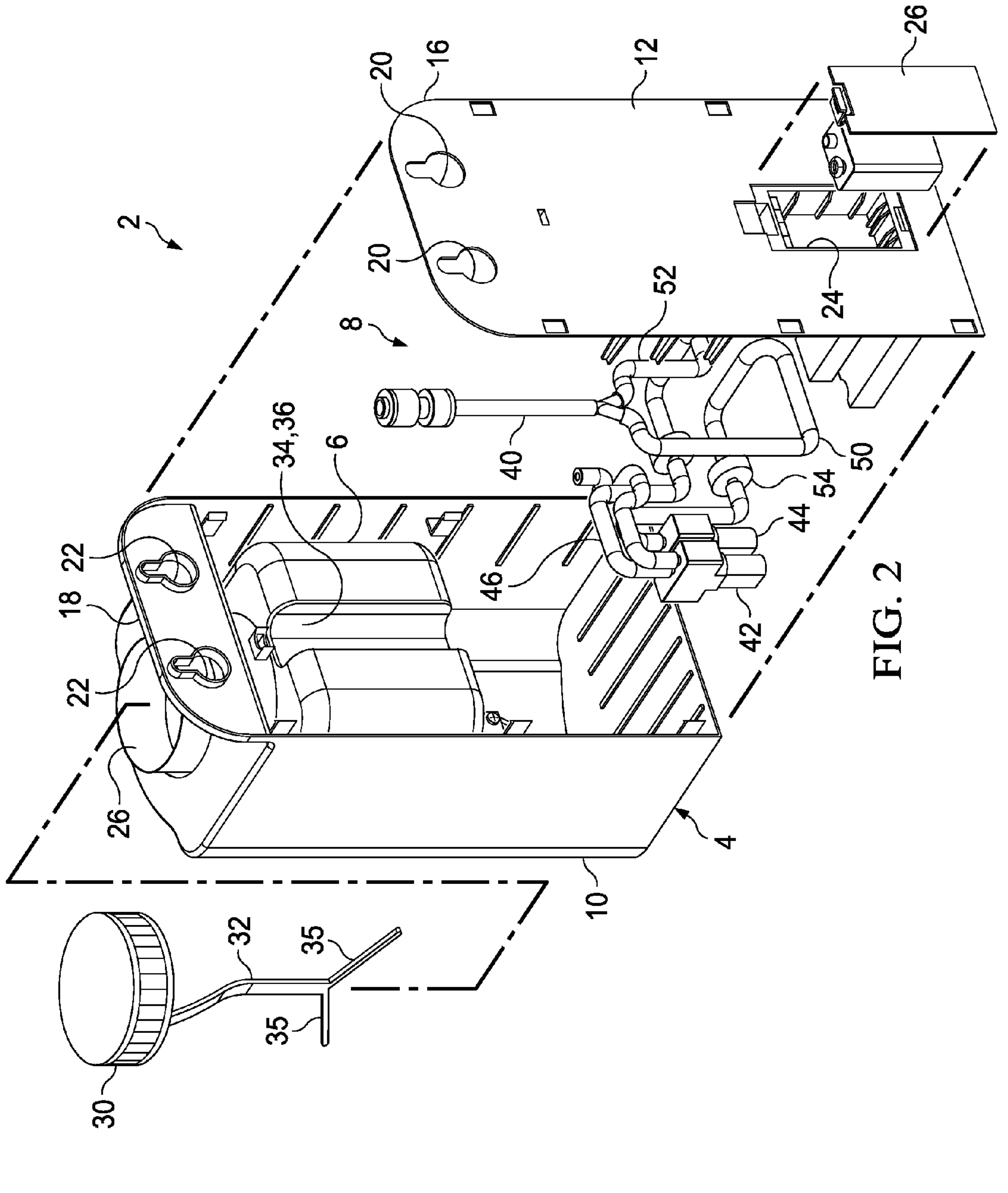
FIG. 2 is an exploded rear perspective view of the inventive dispenser apparatus 2.
Figure 3:
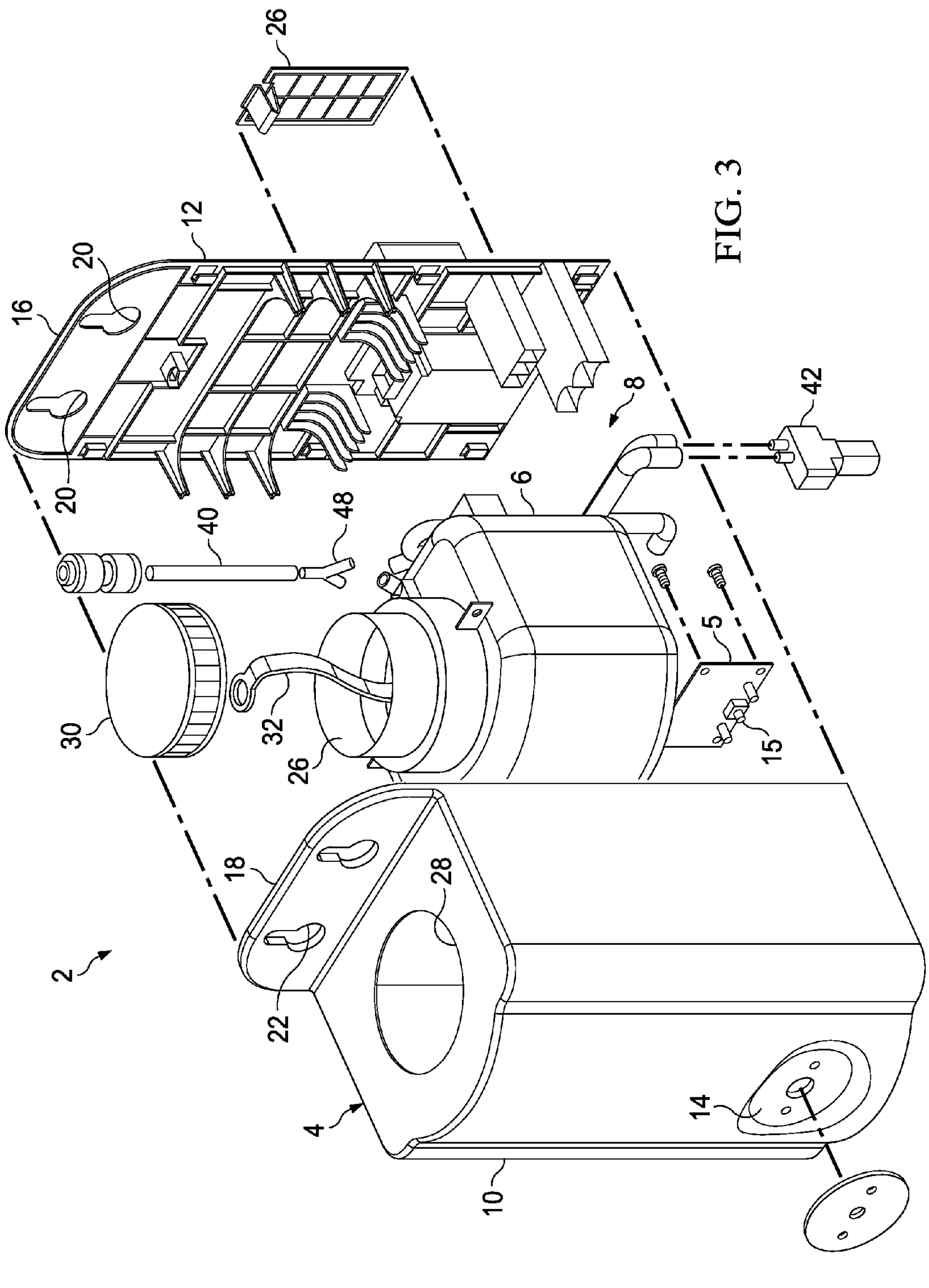
FIG. 3 is an exploded front perspective view of the inventive dispenser apparatus 2.

An embodiment 2 of the inventive dispenser apparatus is illustrated in FIGS. 1-3. The inventive dispenser 2 preferably comprises: a housing 4; a container 6 which is removably positionable within the housing 4 for holding a treatment liquid, a treatment liquid solution, or other treatment fluid; a delivery assembly 8 for delivering the treatment fluid from the container 6 to the condensation drainage line; and a control device (e.g., a circuit board having a micro-controller mounted thereon) 5 which is electronically linked to the delivery assembly 8.

The housing 4 preferably comprises (a) a hollow front piece 10 in which the container 6 and the delivery assembly 8 are received and (b) a back plate 12 which can be releasable secured to the back of the front piece of 10 for closing the housing 4. The hollow front piece 10 and the back plate 12 can be formed of injection molded HDPE or of any other material desired. A cutout 14 is provided in the front face of the hollow front piece 10 for receiving a button, switch, or other manual actuator 15 which is electronically linked, preferably by a wired or circuit connection, to the control device 5 for activating the inventive dispenser 2 to deliver a predetermined amount (i.e. a desired dose) of the treatment fluid to the condensation drainage line.

Corresponding mounting bracket pieces or extensions 16 and 18 are provided respectively at the upper end of the housing back plate 12 and at the upper end of the rear side of the housing front piece 10. The bracket extensions 16 and 18 have corresponding pairs of keyhole screw apertures 20 and 22 formed therethrough for mounting the inventive dispenser apparatus 2 on a wall, a wall stud, or other structure.

A battery compartment 24 and a removable cover 26 therefor are also preferably provided on the rear side of the housing back plate 12. It will be understood, however, that the inventive dispenser apparatus 2 can alternatively include a power cord for plugging the inventive apparatus 2 into an electrical outlet or can include or be connected to any other desired power source.

The container 6 which holds the treatment fluid can be formed of a transparent HDPE plastic or of any other desired material. The container 6 preferably also includes: a top opening 26 which will extend upwardly through a corresponding aperture 28 provided through the top of the housing front piece 10; a threaded cap 30 or other suitable closure for opening and closing the top opening 26 of the container 6; cap retention band 32 which is attached to the threaded cap 30 and has flexible retention legs 35 on the end thereof which are received and held in the container 6; and an upwardly extending exterior channel 34 which is formed in the back side 36 of the container 6 for receiving a treatment delivery line 40 of the delivery assembly 8 so that the treatment delivery line 40 is allowed to extend upwardly in the housing 4 through the exterior channel 34 of the container 6.

The treatment fluid used in the inventive apparatus can be any liquid, liquid solution, or other fluid which has been used heretofore, or which is otherwise effective, for disinfecting, cleaning, and/or clearing condensation drainage lines.

The delivery assembly 8 of the inventive dispenser apparatus 2 preferably comprises: a liquid pump 42; an air pump 44; a liquid pump inlet line 46 which extends from the bottom of the container 6 to the inlet of the liquid pump 42; a Y fitting 48 connected to the inlet end of the treatment fluid delivery line 40; a liquid discharge line 50 which extends from the discharge outlet of the liquid pump 42 to the Y fitting 48 for delivering the treatment fluid into the treatment delivery line 40; an air discharge line 52 which extends from the discharge outlet of the air pump 44 to the Y fitting 48 for delivering air into the treatment delivery line 40; a check valve or other back-flow preventer 54 provided in the liquid discharge line 50; and a check valve or other back-flow preventer 56 provided in the air discharge line 52.

By way of example, but not by way of limitation, the liquid pump 42 can be a 9 volt water/liquid pump with barb.

By way of example, but not by way of limitation, the air pump 44 can be a 9 volt air pump with barb.

The treatment delivery line 40, the liquid pump inlet line 46, the liquid pump discharge line 50, and the air discharge line 52 can each be formed of either a single length of conduit material (e.g., a length of flexible hose) or two or more segments of the conduit material connected in series by means of fittings, check valves, or other connectors. Each of the lines 40, 46, 50, and 52 will preferably be formed of one segment or a combination of two or more segments of ¼ inch flexible hose.

In accordance with the method of the present invention, the inventive dispenser apparatus 2 can be mounted in the user's garage or at any other convenient location on any floor or level of the user's home or building, either at, below, or above the elevation of the inlet end 7 of the air conditioner condensation drainage line 9. The treatment delivery line 40 extending from the top of the dispenser 2 will preferably be extended to the condensate drainage system such that the outlet end of the treatment delivery line 40 will be positioned either above, at, or inside the inlet end 7 of the condensation drainage line 9, or at any other desired location for delivering the treatment fluid from the inventive dispenser apparatus 2 into the condensation drainage line 9. By way of example, the treatment fluid delivery point 7 can be located in an attic or upper floor 11 of a building and the dispenser apparatus 2 can optionally be mounted in a different floor 13 of the building which is elevationally lower than the attic or upper floor 11.

At any desired time after the inventive dispenser apparatus 2 is installed, the liquid pump 42 can be activated to pump a predetermined amount or other desired amount of the treatment fluid from the treatment fluid container 6 into the treatment delivery line 40. Next, preferably following a slight delay of 30 seconds or less, the air pump 44 is activated to deliver a sufficient amount, preferably a burst, of air at a sufficient pressure to push the dose of the treatment fluid through the treatment delivery line 40 and into the condensation drainage line.

These operations will preferably be performed by the system control device 5. The control device 5 can be, for example, a circuit board having a micro-controller mounted thereon which is in electronic communication with the liquid pump 42 and the air pump 44. The micro-controller will preferably be programmed so that, when the user presses the actuator button 15, the control device 5 will then automatically operate to (a) activate the liquid pump 42 to deliver a predetermined amount of the treatment fluid from the container 6 to the treatment delivery line 40 and then subsequently (b) activate the air pump 44 to discharge a sufficient amount of air at a sufficient pressure into the treatment delivery line 40 to push the dose of treatment fluid through the treatment delivery line 40 and into the condensation drainage line.

Thus, the present invention is well adapted to carry out the objects and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within this invention as defined by the claims.

What is claimed:

1. A method of treating a condensation drainage line comprising the steps of:

(a) positioning an outlet end of a treatment delivery line of a dispenser apparatus such that said treatment delivery line will deliver a treatment fluid to said condensation drainage line, said dispenser apparatus comprising:

a container for said treatment fluid, a liquid pump having an inlet for receiving said treatment fluid from said container, said liquid pump also having a discharge for delivering said treatment fluid to said treatment delivery line, and an air pump having a discharge for delivering air to said treatment delivery line, and (b) dispensing an amount of said treatment fluid through said treatment delivery line from said dispenser apparatus to said condensation drainage line by the steps of (i) activating said liquid pump to deliver said amount of said treatment fluid into said treatment delivery line wherein at least a portion of said amount of said treatment fluid remains in said treatment delivery line and then (ii) activating said air pump to discharge a burst of air into said treatment delivery line which pushes said portion of said amount of said treatment fluid out of said treatment delivery line and into said condensation drainage line.

2. The method of claim 1 wherein said dispenser apparatus further comprises a programmed control device which operates to activate said liquid pump in accordance with step (i) and then operates to activate said air pump in accordance with step (ii).

3. The method of claim 2 further comprising the step of actuating said control device to cause said control device to perform steps (i) and (ii).

4. The method of claim 1 wherein:

said amount of said treatment fluid is dispensed to said condensation drainage line in step (b) at a treatment fluid delivery location located at a first elevation, and said method further comprises the steps, prior to step (a), of locating said dispenser apparatus at a second elevation which is below said first elevation and extending said treatment delivery line from said dispenser apparatus at said second elevation to said delivery location at said first elevation.

5. The method of claim 4 wherein said condensation drainage line is an air conditioner condensation drainage line.

6. The method of claim 5 wherein:

said treatment fluid delivery location for said condensation drainage line is located in an attic of a building, and said dispenser apparatus is located in a floor of said building which is elevationally lower than said attic.

* * * * *